United States Patent [19]

Shimizu et al.

[11] Patent Number: 4,468,719
[45] Date of Patent: Aug. 28, 1984

[54] POROUS BODY FOR A SOLID ELECTROLYTIC CAPACITOR AND PROCESS FOR PRODUCING THE SAME

[75] Inventors: Shigeaki Shimizu; Yoshimi Kubo; Tetsuo Suzuki; Takashi Kizaki; Hitoshi Igarashi, all of Tokyo, Japan

[73] Assignee: Nippon Electric Co., Ltd., Tokyo, Japan

[21] Appl. No.: 250,408

[22] Filed: Apr. 2, 1981

[30] Foreign Application Priority Data

Apr. 2, 1980 [JP] Japan .................................. 55-43325

[51] Int. Cl.³ .......................... H01G 9/00; B22F 1/00
[52] U.S. Cl. ...................................... 361/433; 75/249; 419/60
[58] Field of Search ................... 361/433; 75/228, 245, 75/249; 419/57, 60; 428/566

[56] References Cited

U.S. PATENT DOCUMENTS

| 3,428,490 | 2/1969 | Bravo et al. | 428/566 X |
| 3,641,399 | 2/1972 | Klein et al. | 361/433 |
| 4,331,477 | 5/1982 | Kubo et al. | 75/228 |

Primary Examiner—Andrew J. James
Assistant Examiner—J. L. Badgett
Attorney, Agent, or Firm—Laff, Whitesel, Conte & Saret

[57] ABSTRACT

A porous body of Ti-Al alloy has a novel structure for a solid electrolytic capacitor, having improved values of leakage current and dielectric loss. The porous body of Ti-Al alloy has spherical particles which partially contact each other to form an integral body. The surfaces of the spherical particles have a ruggedness in the order of several microns or less. Because the diameter of the spherical particle is greater than the size of the ruggedness, the porous body has rough voids which provide a wide passageway through which a manganese nitrate solution penetrates. The wide passageway is effective for decreasing the number of times when there is a thermal decomposition of the manganese nitrate, thereby reducing the series resistance of the resultant cathode. In addition, this novel structure makes it possible to avoid production difficulties which are usually encountered when a solid electrolytic capacitor, having a high capacitance, is produced from a finely divided Ti-Al alloy.

3 Claims, 17 Drawing Figures

POROUS BODY FOR A SOLID ELECTROLYTIC CAPACITOR AND PROCESS FOR PRODUCING THE SAME

BACKGROUND OF THE INVENTION

1. Field of the Invention

The present invention relates to a porous body for a solid electrolyte capacitor. More particularly, the present invention relates to a porous body for a solid electrolyte capacitor which consists of a titanium-aluminum (Ti-Al) alloy which has a double rugged structure and to a process for producing the same.

As used herein, the term "double rugged structure" is such a porous structure which consists of large voids producing a knobby, rough, hill and vale texture on the surface of primary particles.

2. Description of the Prior Art

At present, tantalum has been widely used as a valve metal for a solid electrolytic capacitor. However, despite its excellent properties, a tantalum (Ta) solid electrolytic capacitor has no great promise in the future, from the viewpoint of tantalum resources. In recent years, a large amount of tantalum has been consumed as a material for a capacitor. As a result of this, tantalum-containing ore, which in itself is a rare resource, has been increasingly exhausted. The exhaustion of the tantalum resources results in a substantial increase of cost of tantalum, which in turn will lead to a loss of marketability for the tantalum capacitor in the near future because of its inevitably increasing cost. Accordingly, there is a strong need for a solid electrolytic capacitor made of a material capable of substituting for tantalum. As an anode material for a solid electrolytic capacitor, such material should meet the following requirements:

(1) A material cost is cheap;
(2) It can be formed into a porous body having a high surface area;
(3) A capacitance per unit area ($\mu FV/cm^2$) is high; and
(4) Properties, other than capacitance, such as dielectric loss and leakage current, are equivalent to or better than the corresponding properties of the Ta solid electrolytic capacitor.

One anode material for a solid electrolytic capacitor, which can substantially satisfy the above-mentioned requirements, is described in U.S. Pat. No. 3,599,053. An Al-Ti alloy porous body is made by vacuum melting or arc melting of Al-Ti alloy powder. However, the vacuum melting or arc melting process has the disadvantages since the production process for the porous body is complicated, and since the resultant porous body has a low specific surface area which makes it difficult to produce a capacitor having excellent properties.

On the other hand, the inventors of the present invention have described a process for producing a Ti-Al porous body, in U.S. patent application Ser. No. 82,217. This process comprises press-shaping a mixture of finely divided titanium and aluminum powder and then subjecting the press-shaped body to a suitable heat treatment. In accordance with this process, it is easy to obtain a porous body of Al-Ti alloy having a density of 20 to 70% of a theoretical density and a specific surface area from 0.01 to 1.0 $m^2/g$. In this process, a porous body of Al-Ti alloy having a high specific surface area can be made directly from Ti powder and Al powder, and therefore, the production process is simple. The wet properties of the porous body indicated that an excellent high capacitance capacitor exhibiting a low leakage current and dielectric loss can be made therefrom.

However, the Ti-Al porous body, and the process therefor, according to U.S. patent application Ser. No. 82,217 (now U.S. Pat. No. 4,331,477) suffer from the following disadvantages. That is, in order to obtain a porous body having a high specific surface area which may be a replacement for a porous body made of tantalum, it is necessary to use a super-fine powder, with an average grain having a diameter of about several microns. Although such a fine powder can provide a porous body having a desired specific surface area, it is naturally excessively oxidized. Therefore, the resultant porous body is remarkably inferior in respect of the leakage current and dielectric loss when it is formed into a solid electrolytic capacitor. Therefore, such a porous body is useless as an anode material for the solid electrolytic capacitor.

On the other hand, in the formation of a cathode of a manganese dioxide layer, a porous Ti-Al alloy body presents another problem when it is obtained merely by remarkably decreasing a particle size while maintaining the conventional structure thereof. That is, it is difficult and complicated to form a manganese dioxide cathode layer by decomposition of manganese nitrate on a porous anode body having a too fine structure.

There is no other known excellent process for forming a solid cathode which is comparable with the use of manganese nitrate. Accordingly, the Ti-Al alloy porous anode body is also required to have a high resistance to the thermal decomposition treatment of manganese nitrate. Usually, the cathode formation is conducted through a plurality (normally, 5 to 10 times) of thermal decompositions of manganese nitrate.

In the case of the Ta solid electrolytic capacitor, it is well known that the leakage current and dielectric loss after solidification can be greatly varied by changing the thermal decomposition conditions such as temperature-rising speed, atmosphere and the like. Usually, the optimal conditions for these properties have been selected. However, even in the light of these experiences, it is apparent that the leakage current tends to increase as the number of decompositions is increased.

In the Ta solid electrolytic capacitor, it is general that the porous body should be subjected to a re-formation treatment to repair the damaged portion thereof. Also, when the porous body has a conventional structure composed of finely divided particles, each in the form of a sphere, if the size of the particles is micronized, the void structure in the porous body becomes necessarily fine, which prevents a solution of manganese nitrite from penetrating into the interior of the porous body. When such impregnated porous body is subjected to a heat treatment for the thermal decomposition of the manganese nitrate, the absolute amount of manganese dioxide deposited within the porous body is insufficient, which results in an increase in series resistance as a cathode.

As a result of examinations made by the inventors, it was found that an oxide film obtained by subjecting a homogeneous Ti-Al alloy to a formation treatment deteriorates much more remarkably on thermal decomposition of manganese nitrate than it deteriorates in the Ta porous body. It is thought that this deterioration occurs because both Ti and Al essentially are far more chemically active than Ta. A reduction in the number of times that the manganese nitrate decomposition occurs is most effective for preventing the deterioration, i.e. the increase in the leakage current, occurred during the decomposition procedure.

In order to avoid the above-mentioned disadvantages, to reduce the series resistance of the cathode, and the dielectric loss and to realize satisfactory capacitor properties, the voids within the porous body should be large-sized and the specific surface area of the porous body should also be large. The large-sized voids enables a satisfactory cathode formation, even if the number of times of the thermal decomposition of manganese nitrate is reduced. In contrast, with small-sized voids, the cathode should be gradually formed to a desired thickness while preventing a liquid passageway through the void from becoming clogged at the initial stage of the decomposition, by a well known method of repeating the decompositions using a methanol-diluted solution of manganese nitrate. Accordingly, the number of times that the decomposition occurs is inevitably increased.

When a Ti-Al alloy capacitor is to be produced with a capacitance (capacitance/volume) comparable to that of the Ta capacitor, merely by micronizing the structure of a porous body of Ti-Al alloy while maintaining the conventional configuration of the porous body structure, as already described above, the preparation of the porous body is difficult and complicated and the electric properties of the resultant porous body having a manganese dioxide cathode are inferior. Accordingly, it is difficult to replace Ta with a Ti-Al alloy, which is an inexpensive material for industrial purposes.

As described above, the porous body according to U.S. patent application Ser. No. 82,217 had the disadvantage that despite its high specific surface area, the unique characteristic could not be effectively utilized in the production of a solid electrolytic capacitor where the specific surface area is too high.

SUMMARY OF THE INVENTION

An object of the present invention is to provide a porous body for a solid electrolytic capacitor which is capable of substituting for a tantalum porous body and which exhibits a high capacitance despite the small size thereof, and it is inexpensive.

Another object of the present invention is to provide a porous body of Ti-Al alloy with a novel structure for a solid electrolytic capacitor having improved values of leakage current and dielectric loss.

A still another object of the present invention is to provide a process for producing a porous body having a high specific surface area and large-sized voids for a solid electrolytic capacitor, which comprises pressing a Ti-Al mixed powder into a press-shaped body and heat-treating the body.

The porous body of the Ti-Al alloy, according to the present invention, is characterized by having a double rugged structure. That is, the porous body of the present invention is of such a structure that the particles in the form of a sphere partially contact with each other to form an integral body. The surface of each of the respective spherical particles has fine ruggedness formed thereon. If the size of the fine ruggedness is in the order of several microns or less, even where the diameter of the spherical particle is large, the specific surface area per unit volume is satisfactorily large. Also, because the diameter of the spherical particle is much greater than the size of the ruggedness, the porous body has rough voids therein which provide a wide passageway through which a manganese nitrate solution penetrates. The wide passageway is effective for decreasing the number of times that the thermal decomposition of the manganese nitrate occurs, thereby reducing the series resistance of the resultant cathode. In addition, the novel structure of the porous body makes it possible to avoid the difficulties in the production technique which are encountered when a solid electrolytic capacitor having a high capacitance is to be produced from a finely divided Ti-Al alloy, by using the prior art.

It is desirable for the size of the ruggedness on the respective particles to be in a range of 0.5 to 5 $\mu$m. If the ruggedness size is less than 0.5 $\mu$m, the ruggedness is made flat by an oxide film formed thereon, through anodic oxidation. Accordingly, an increase in the capacitance of the resultant capacitor cannot be expected. If the ruggedness size is more than 5 $\mu$m, the resultant anode body cannot exhibit a high capacitance, comparable with that of the Ta anode body. In the production of the porous body having the above-mentioned fine ruggedness, Ti powder is used having an average particle size of from 10 to 30 $\mu$m. If the particle sizze is less than 10 $\mu$m, the titanium particles are excessively oxidized. The excessive oxidation causes the porous body to lose the fine rugged structure, which results in a deterioration of the electrical properties of the resultant capacitor. On the other hand, if the particle size of the titanium powder is more than 30 $\mu$m, the resultant anode body cannot exhibit a high capacitance comparable with that of the Ta anode body.

Also, the Al powder has an average particle size of 1/6 to $\frac{1}{2}$ of the particle size of the Ti powder. This particle size range of the Al powder is necessary for forming large-sized voids throughout the porous body, forming a uniform fine ruggedness on the surface of the body and ensuring a uniform composition of the surface of the body. If the ratio of an average particle size of the Al powder to an average particle size of the Ti powder is higher than $\frac{1}{2}$, the desired double rugged structure cannot be obtained and the surface composition of the resultant porous body becomes non-uniform. On the other hand, when the ratio is lower than 1/6, the size of the resultant ruggedness becomes small and uniform, whereby the resultant capacitor cannot exhibit a high capacitance. With regard to the composition of a mixture of Al powder and Ti powder, it is desirable for the Al powder to be in a range of from 50 to 70 atomic %. This Al atomic % range is effective for obtaining a high electrostatic capacity per unit volume and most excellent solid capacitor properties. In the Ti-Al alloy porous body of the invention, the composition at the surface portion of the respective spherical particles in contact with each other is Al-rich as compared with the average ratio of the Al-Ti alloy composition.

The Ti-Al alloy porous body is produced by mixing Ti power having a particle size within the above-mentioned range with Al powder having a particle size within the above-mentioned range. The mixture is pressed under pressure and the resulting pressed body is heat-treated. The press-shaping can be effected in a well-known conventional manner.

In order to form stably the double rugged structure, it is necessary for the heat treatment to be carried out at a temperature in the range extending from 500° C. to a temperature which is less than the melting point of Al, for a period between 5 minutes and 60 minutes. If the heat treatment is at a temperature less than 500° C., it is ineffective because aluminum is not diffused into titanium to a significant degree. The diffusion of aluminum into titanium reaches an almost significant level at a temperature of 500° C. or more. For example, when the heat treatment is carried out at a temperature of 500° C. for about 5 minutes, the alloying of aluminum with titanium proceeds to a significant degree due to a so-called Kirkendall effect. Accordingly, the heat treatment temperature of 500° C. is satisfactorily effective for industrial purposes.

On the other hand, if the alloying of Al with Ti is to be carried out by abruptly heating to a high temperature which is above the melting point of Al, the fusion of the Al precedes, which results in an abnormal expansion of the resultant porous body. Alternatively, as is usual with a liquid phase sintering, the product, while being porous, exhibit a low specific surface area. That is, a porous body is obtained whose voids are not connected to the outer surface. Therefore, such a high temperature heat treatment produces a porous body which is unsuitable as an anode for a solid electrolytic capacitor.

The melting point of aluminum, as used in this specification, is somewhat different from the melting point, i.e. 660° C., of aluminum as a simple element. When particles of titanium and aluminum are heated in contact with each other, interdiffusion takes place therebetween. As a result, the melting temperature, i.e., the melting point, of the aluminum diffused into the titanium (having a higher melting point) becomes higher than the melting point of pure aluminum. That is, the melting point of this diffused aluminum is about 665° C. This aluminum melting point is hereinafter referred to as the "effective melting point".

If the heat treatment temperature is higher than the effective melting point, the same problems occur as in the case of the above-mentioned liquid phase sintering. As the process for producing a porous body for a solid electrolytic capacitor, a process is desirable by which a porous body having a constant and high specific surface area can be stably produced. In addition, the porous body should exhibit a high mechanical strength when formed into a solid electrolytic capacitor. For this purpose, the mixture of aluminum and titanium is heated at a temperature of 500° C. up to a temperature less than the effective melting point of aluminum. A porous body is formed, and the resultant porous body should be re-heated at a temperature of 1100° C. or less for 5 to 180 minutes. Although this two-step heat treatment seems, at a glance, to be similar to the above-mentioned liquid phase sintering, the two treatments are, in fact, quite different from each other. That is, in the two-step heat treatment, the Ti-Al reaction is substantially completed in the first heat treatment step. When the porous body so obtained is subjected to the second heat treatment, at a temperature which is higher than the effective melting point of aluminum, the mechanical strength of the porous body can be increased without causing the phenomena, as in the case of the liquid phase sintering. If the re-heat treatment is carried out at a temperature higher than 1100° C., the aluminum is excessively diffused into the titanium, which causes the fine ruggedness to be flat, whereby the double rugged structure is lost. For this reason, the re-heat treatment temperature should be limited to 1100° C. or less.

DETAILED DESCRIPTION OF THE PREFERRED EMBODIMENTS

Figure 1A:
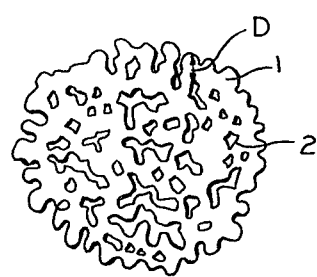
FIG. 1(a) is a schematic cross sectional view of the structure of a conventional, prior art porous body in which D indicates a particle size.
Figure 1B:
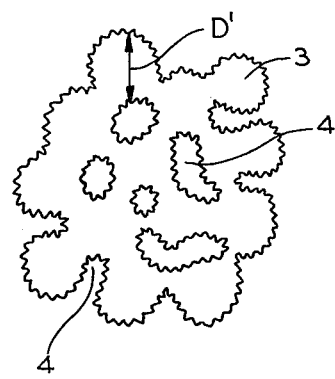
FIG. 1(b) is a schematic cross sectional view of the structure of a porous body according to the present invention in which D' indicates a particle size of a primary particle.

The difference in structure between a porous body according to the present invention and conventional porous body is shown in FIG. 1, which shows two optional cross sections of the porous body. FIG. 1(a) is a cross sectional view of the conventional porous body. In FIG. 1(a), it is clear that the conventional porous body consists of finely divided particles 1, each in the form of a sphere, and voids 2 there between. FIG. 1(b) is a cross sectional view of an example of a porous body according to the present invention. In FIG. 1(b), it is apparent that the porous body has a fune ruggedness on the surface thereof. As compared with FIG. 1(a), the porous body according to the present invention has larger particles 3 and larger voids 4 there between. In addition, the porous body of the present invention has a fine ruggedness formed on the surfaces of the respective particles 3.

As is apparent from FIG. 1, the porous body of the present invention has larger voids 4 than the conventional porous body has, notwithstanding the fact that the specific surface area of the present porous body is almost equal to that of the conventional porous body. In addition, the average diameter D' of the particles 3, constituting the porous body of the present invention, is larger than the average diameter D of the particles 1 constituting the conventional porous body. The porous body of the present invention, which is composed of large particles having a fine ruggedness on the surface thereof, has the following advantages.

(a) The use of a super-fine powder of Ti-Al alloy, which is unsuitable as the capacitor material, is avoided in the production process. The capacitance per volume value reaches a satisfactory level which is equal to that of the Ta porous body.

(b) The liquid passageway through which a manganese nitrate solution may penetrate is wide, which makes it possible to reduce the number of times of the thermal decomposition of manganese nitrate and to prevent a formation of a film on the Ti-Al alloy from deteriorating.

(c) For the same reason, as described in (b), the dielectric loss due to the series resistance of the cathode can be reduced.

(d) Generally, the voltage drop within the porous body during the formation procedure becomes small, which makes it possible to effect the formation and re-formation of both the surface and the interior of the body in a short period of time. Also, the washing and drying procedures can be rapidly carried out. Similarly, even when the porous body is subjected to an etching treatment to reduce the leakage current, the reaction products due to the etching procedure can be washed away more readily than in the case of the conventional porous body.

The porous body may be produced with a double ruggedness on the surface thereof, according to the present invention, by the following possible processes.

(1) A porous body is produced in a conventional manner and, thereafter, the porous body is subjected to any suitable etching treatment, to form fine ruggedness on the surface thereof.

(2) A porous body is provided in a conventional manner and, thereafter, the porous body is heated in hydrogen to cause an appropriate amount of hydrogen to be occluded therein. Then, the hydrogen occluded porous body is dehydrogenated in a vacuum to roughen the surface thereof.

(3) A conventional Ti-Al alloy powder is subjected to any suitable heat treatment in hydrogen to cause the hydrogen to be occulated therein. Thereafter, the hydrogen occluded powder is dehydrogenated to roughen the surface thereof. The resultant powder is pressed and the shaped body is sintered to form a porous body composed of particles having ruggedness on the surface thereof.

(4) The Kirkendall effect is utilized.

The porous body having the above-mentioned unique configuration may be formed by various processes as mentioned above and these processes respectively have merits and demerits. The process (4) utilizing the Kirkendall effect is favorable, since it is capable of being easily practiced on an industrial scale and of producing stably the desired porous body at a low cost.

A combination of titanium and aluminum is a combination of two elements, the melting points of which are substantially different from each other. It is known that when these elements are heat-treated in contact with each other, the aluminum atoms diffuse into the lattice of the titanium, at an overwhelming speed, to form a reaction layer of Ti-Al.

In the case of the Ti-Al system, the Kirkendall effect occurs through the medium of vacant lattice points, so that the aluminum atom diffused into the titanium. In the past, detailed examinations have not been made as to whether or not these vacant lattice points gather together to form a void and as to conditions under which the void is formed. The explanation of these problems is published for the first time in the present invention.

When titanium particles and aluminum particles are heat-treated in mechanical contact with each other, interdiffusion takes place through the initial interface there between. In this case, there is an overwhelmingly great difference between the diffusion rates of these two atoms. The diffusion rate of the aluminum atom is far greater than that of the titanium atom. As a result, a number of vacancies are formed on the aluminum side (Clearly speaking, the individual vacancy should be possibly called a "Kirkendall vacancy"). The above-mentioned diffusion process is chematically represented by a shift from FIG. 2(a) to FIG. 2(b). The reasons for various limitations defined in the present invention will be illustrated hereinafter.

Figure 2A:
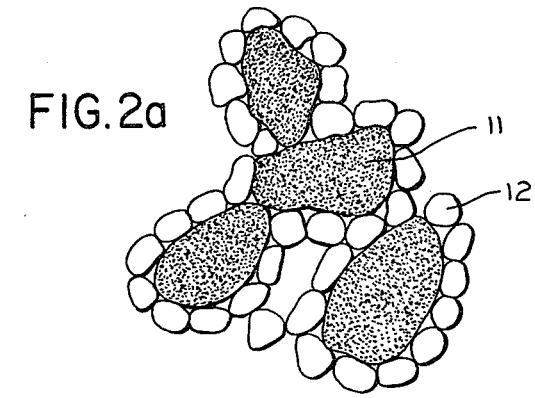
FIG. 2 is a schematic cross sectional view of a porous body being produced in the order of (a), (b) and (c) in accordance with the present invention.
Figure 2B:
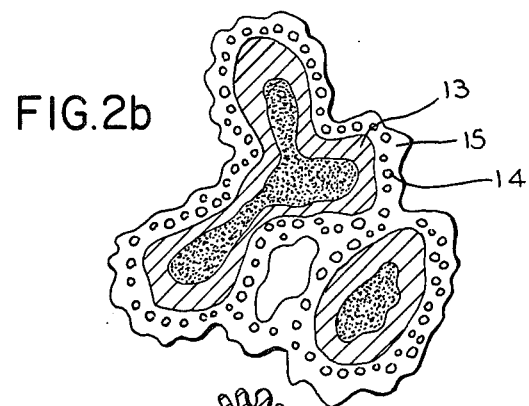

FIG. 2(a) shows a typical condition of the initial interface between the titanium particles and the aluminum particles which are in mechanical contact with each other. That is, the titanium particles 11 having a large particle size are surrounded by the aluminum particles 12 having a small size. Microscopically, the difference of the particle sizes of the titanium particle and the aluminum particle contributes to the formation of vacancies (not Kirkendall vacancy) of the intended porous body. The aluminum particles 12 diffuse into the titanium particles 11 through the contact interface there between, to form a reaction layer 13 of Ti-Al as shown in FIG. 2(b). While the individual aluminum particles are fused with each other and the pure aluminum layer 15 is gradually reduced, a group of Kirkendall voids 14 is formed.

Figure 2C:
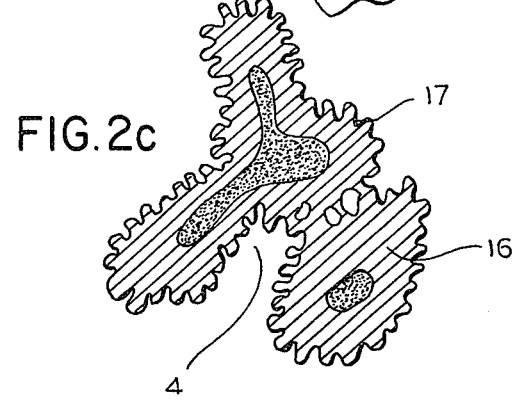

With the lapse of time, the condition of the Ti-Al system shifts from that shown in FIG. 2(b) to that shown in FIG. 2(c). Finally, the pure aluminum layer disappears into the Ti-Al reaction layer 16, while the grown Kirkendall voids are left behind in the form of caves 17, opened outwardly. The condition of the Ti-Al system as shown in FIG. 2(c) satisfies all of the configurations of the present invention. Owing to the outstanding effects due to the difference of the particle sizes of the titanium particle and the aluminum particle, the voids 4 formed in the resultant porous body is desirably larger and more widely opened outward than the voids of the conventional porous body. A fine surface ruggedness results from the deformation of the Kirkendall vacancies, which are formed in a high density on the surface of the porous body. Such a structure cannot be attained in the conventional porous body. Because the fine ruggedness cover the surface of the large, widely and outwardly opened void, it is possible to stably realize an enlargement ratio of the surface area of about 3 to 5. The enlargement ratio of the surface ares is calculated by dividing surface area of porous body, including the surface area of fine ruggendess formed on the surface, by the surface area of the porous body, measured as the sum of the surface area of the void supposing that no fine ruggedness is present on the surface.

The size of the fine ruggedness is in a range of 0.5 to 5 μm. If the size of the fine ruggedness is less than 0.5 μm, the fine ruggedness becomes flat responsive to an oxide film layer formed on the surface by anodic oxidation, which hinders an increase in capacitance. On the other hand, if the size of the fine ruggedness is greater than 5 μm, an anode body cannot be obtained which exhibits a high capacitance comparable with that of the Ta porous body.

More concrete examples of the present invention will be described hereunder.

Titanium powder having an average particle size of 30 μm was mixed with aluminum powder having an average particle size of 15 μm in an atomic percent (%) ratio of 50:50. The mixture was molded under compression to form a shaped product. The shaped product was heated in a vacuum furnace having a vacuum of $10^{-6}$ mmHg, at a temperature of 600° C. for 10 minutes and, subsequently, at a temperature of 1000° C. for 2 hours.

Figure 3:
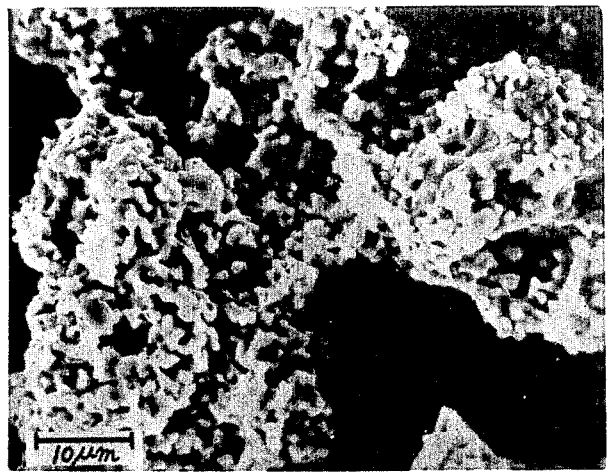
FIG. 3 is a secondary electron image under a scanning type electron microscope of the interior of a porous body according to the present invention, at a magnification of 1800.

FIG. 23 shows an example of a secondary electron image under a scanning type electron microscope of the internal structure of the resulting porous body, at a magnification of 1800. In FIG. 3, the portion which appears dark indicates the large, outwardly opened void. It is apparent from FIG. 3 that the fine ruggedness is in the form of spheres having a size of several microns, which clearly appear to be originated from the Kirkendall vacancies. These spheres are formed in a high density on the surface of rough ruggedness having a diameter of several tens of microns.

Then, the porous body was anodically oxidized in an aqueous solution of 1% of ammonium borate, at a voltage of 40 V. The resultant porous body exhibited a capacitance of about 32000 μF.V/cm². Because the capacitance per unit area of the porous body is considered 8 μF.V/cm², it is apparent that the porous body has a specific surface area as high as 4000 cm²/cm³. This value is remarkably high, even as compared with the original specific surface area (about $10^3$ cm²/cm³) of the raw powders. Therefore, such a high specific surface area is clearly ascribable to the double rugged structure of the porous body according to the present invention.

Figure 4:
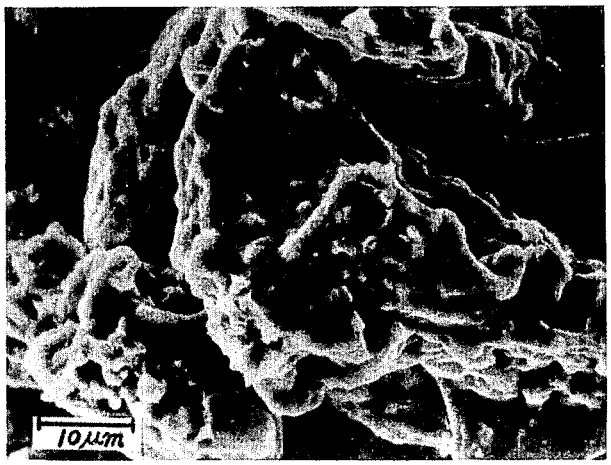
FIG. 4 is a secondary electron image under a scanning type electron microscope of the interior of a porous body containing 22 atomic % of Al outside the scope of the present invention, at a magnification of 1800.

The same examination was made when the composition of a mixture of aluminum powder and titanium powder is variously changed. When the aluminum is less than 25 atomic %, the resultant porous body has little ruggedness on the surface thereof, as is evidenced in FIG. 4 indicating a secondary electron view under a scanning microscope of the porous body, at a magnification of 1800. On the other hand, if the aluminum is more than 80 atomic %, the resultant porous body is abnormally buldged and simultaneously, exhibits a decreased specific surface area.

Figure 5:
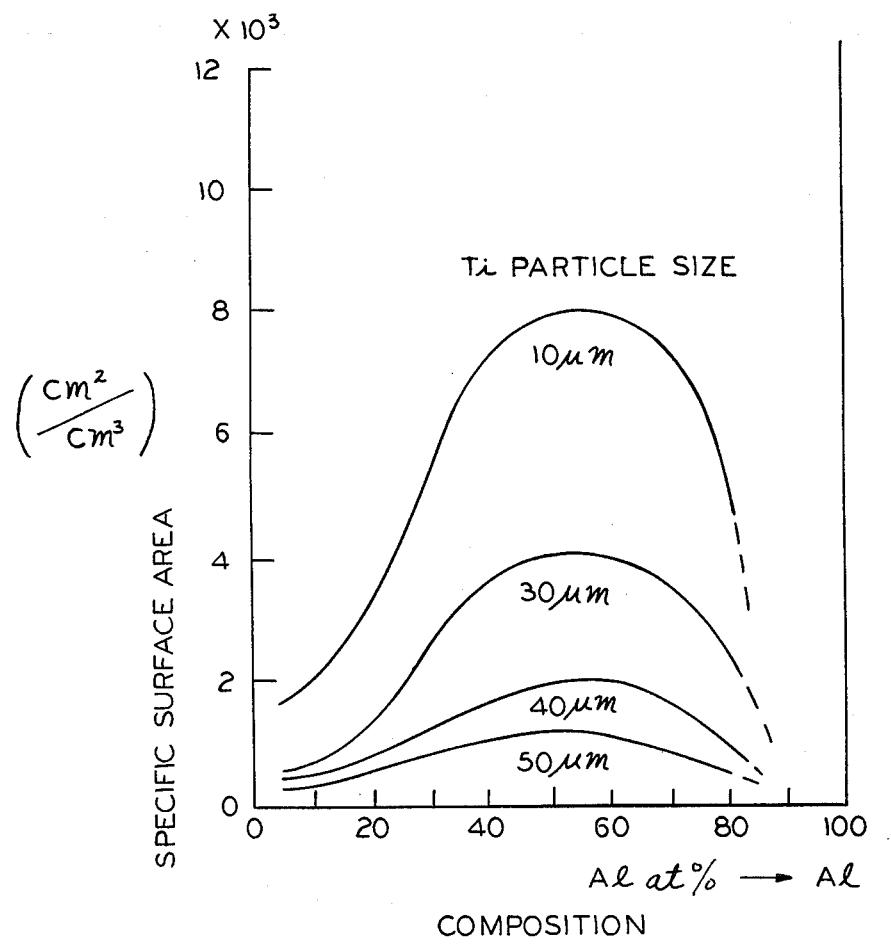
FIG. 5 is a graph indicating the relationship between the specific surface area of a porous body, the composition of the body, and the average particle size of titanium.

Then, titanium powder having an average particle size of 10 μm, 30 μm, 40 μm or 50 μm was respectively mixed with aluminum powder having an average particle size of 5 μm. The mixture was pressed to form a shaped body. The shaped body was heat-treated at a temperature of 550° C. for 1 hour and, then, it was re-heat treated at a temperature of 1050° C. for 1 hour. The relationship between the specific surface area and the composition of the starting powdery mixture, with respect to a parameter of the average particle size of titanium, is shown in FIG. 5. FIG. 5 clearly indicates that a remarkably high specific surface area can be obtained when the starting powder mixture contains from 40 to 70 atomic % of aluminum. However, the specific surface area is decreased as the average particle size of the titanium is increased. The use of the titanium having an average particle size of from 40 to 50 μm results in a too small specific surface area.

Generally, it is known that the structure of a porous body becomes fine as the size of the average grain of the starting powders which is used also becomes fine. However, in order to obtain a porous body having a desired double rugged surface, the ratio of the particle size of the aluminum to the particle size of the titanium should be limited to a special value.

The inventors of the present invention found that, when the average particle size of the aluminum powder was less than ½ of that of the titanium powder, the resultant shaped produce comprised the titanium particles uniformly surrounded with the aluminum particles. This shaped product could give a porous body, having a double rugged structure, after being subjected to the two-step heat treatment. Contrary to this, if the average particle size of the aluminum powder was greater than ½ that of the titanium powder. Both the double rugged structure and the surface composition of the resultant porous body were liable to become non-uniform.

It is considered that the above-mentioned asymmetric property with regard to the particle size ratio is due to the asymmetric diffusion phenomenon wherein the aluminum predominantly diffuses into the titanium and little of the titanium diffuses into the aluminum.

Figure 6A:
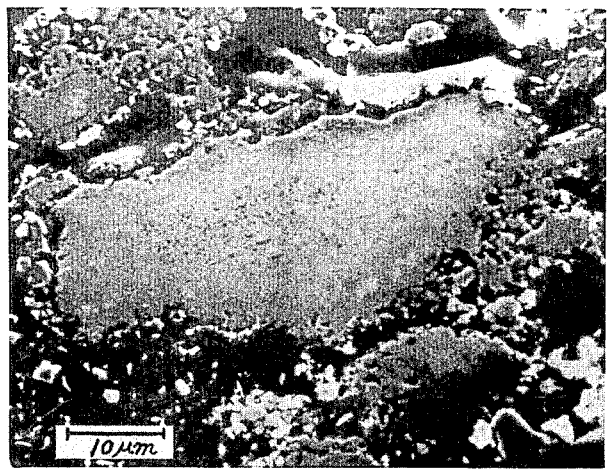
FIG. 6(a) is a secondary electron image under a scanning type electron microscope of the cross sectional area of particles constituting a porous body according to the present invention, at a magnification of 1800.
Figure 6B:
FIG. 6(b) is a Ti characteristic X-ray area analytical image indicating a Ti distribution in the same cross sectional area.
Figure 6C:
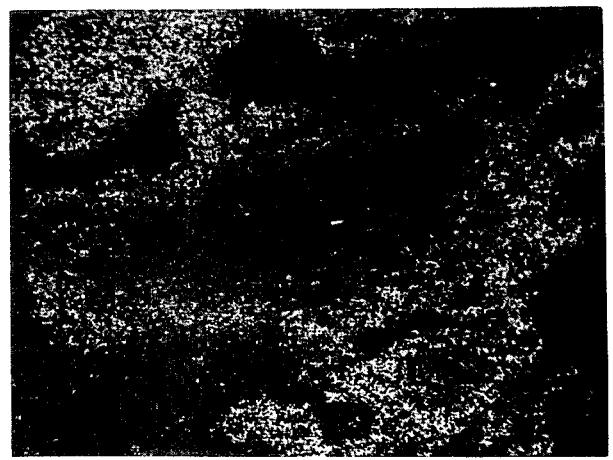
FIG. 6(c) is an Al characteristic X-ray area analytical image indicating an Al distribution in the same cross sectional area.

Then, a resin was embedded in a porous body hving a double rugged structure shown in FIG. 3. The resin embedded porous body was cut and the cross sectional area was observed. The observation result is shown in FIGS. 6(a), 6(b) and 6(c). FIG. 6(a) shows a secondary electron image under a scanning electron microscope of the cross-sectional area, at a magnification of 1800. FIGS. 6(b) and 6(c) show a Ti characteristic X-ray intensity image and an Al characteristic X-ray intensity image of the cross sectional area, respectively, which were photographed by an X-ray analysis device attached to the scanning electron microscope. These three photographs were taken on the same location of the same sample, from different viewpoints.

These photographs clearly indicate that the fine ruggedness, present on the surface of the porous body, is in the form of spheres having an average size of several microns. The finely rugged particles contains a larger amount of the aluminum with respect to the titanium. The primary particle constituting the skeleton of the porous body (i.e. a large particle surrounded by the above-mentioned finely rugged particles) is depletive in aluminum and rich in titanium, at the center portion thereof. Also, these photographs clearly indicate that voids are present between the primary particles. The size of the void is increased in proportion to the size of the primary particle.

As is schematically shown in FIG. 1(b), the porous body according to the present invention has a remarkably broad void channel for its specific surface area. Thus, there is little possibility that the channel may be clogged with manganese dioxide during the formation of a cathode. Further, a detailed quantitative X-ray analysis of the composition of the porous body revealed that the secondary particles forming the fine ruggedness on the surface thereof approximately consisted of Ti Al and/or TiAl₃ regardless of the composition of the starting powdery mixture.

Another X-ray pattern obtained on the porous body demonstrated this composition. As already described above, the diffusion between the titanium and the aluminum proceeds according to the one-sided diffusion of the aluminum into the titanium. In this diffusion process, a TiAl₃ phase is first formed. After the formation of the TiAl₃ is complete, a phase with a higher content of titanium than the TiAl₃ phase is formed by the diffusion of the aluminum. However, the formation of the higher titanium content phase proceeds much more slowly than the formation of the TiAl₃ phase. To ensure that the resultant porous body has a uniform composition corresponding to the composition of the starting powdery mixture, the press shaped body should be heated to a temperature of about 1300° C. or more for a significant period of time.

Of course, the heat treatment at such a high temperature range promotes the interdiffusion between these two kinds of elements which tends to flatten the formed double rugged structure. Accordingly, at such a high temperature, the object of producing a porous body cannot be achieved with the high specific surface area which is intended by the present invention. The heat treatment at a temperature of about 1100° C. or less is suitable for maintaining the double rugged structure of the present invention. As is clearly seen in FIG. 3 and FIGS. 6(a), 6(b) and 6(c), the porous body prepared by the process of the present invention generally has the following characteristics.

(1) It is of a double ruged structure having fine ruggednesses on the surface of the body.

(2) The rugged surface is formed around a nucleus of titanium particle, and the surface portion is rich in aluminum, while the central portion of the particle is rich in titanium.

(3) The composition in the vicinity of the rugged surface on which a dielectric layer is to be formed by anodic oxidation corresponds to a compositional range of TiAl₂ to TiAl₃, irrespective of the composition of the starting powdery mixture.

(4) A remarkably broad void channel has a size in proportion to the diameter of the primary particle formed around a nucleus of titanium.

As the aluminum content in the starting powdery mixture is gradually increased toward 80 atomic %, the aluminum atom deeply diffuses into the center of the primary particle and the amount of the diffused aluminum is also increased. However, it is to be understood that when the Al-Ti porous body is formed into an anode body for a capacitor after being anodically oxidized. The electrical properties of the anode body, as a capacitor, are not directly influenced by the composition of the central portion of the primary particle. The thickness of the oxide layer formed on the surface of the porous body, by anodically oxidizing it, is proportional to the applied anodic oxidation voltage (the formation voltage). Usually, the oxide layer grows at a rate of about 20 Å per volt. Accordingly, when the formation voltage is 100 V, an oxide layer having a thickness of several thousand angstroms is formed on the surface of the porous body.

That is, with regard to the porous body produced according to the process of the present invention, the composition of the spherical particles on the surface of the primary particle, which forms the fine ruggedness as shown in FIG. 3, directly participates in the electrical properties of the resultant capacitor. As described hereinabove, the composition of the spherical particle is approximately in a range of TiAl₂ to TiAl₃, irrespective of the composition of the starting powdery mixture. The fact that the composition of the surface of the porous body is maintained constant, as described above, can warrant the stability of the electrical properties of the resultant capacitor.

The electrical properties of the porous body which is prepared according to the process of the present invention was very excellent. More specifically, a combination of titanium powder having an average particle size of 10 μm and aluminum powder having an average particle size of 5 μm was used to prepare a porous body. The composition of the starting powdery mixture contained from 25 to 80 atomic % of aluminum. The mixture was pressed to form a shaped body having a weight of 0.02 g and a porosity of about 30%. The press-shaped body was heat-treated at a temperature of 500° C. for 10 minutes to promote the Kirkendall effect of the Ti-Al system. Thereafter, the body was reheated at a temperature of 1050° C. for 1 hour. The resulting porous body was anodically oxidized in an aqueous solution of 1% of ammonium carbonate at a voltage of 40 V for 2 hours.

Figure 7A:
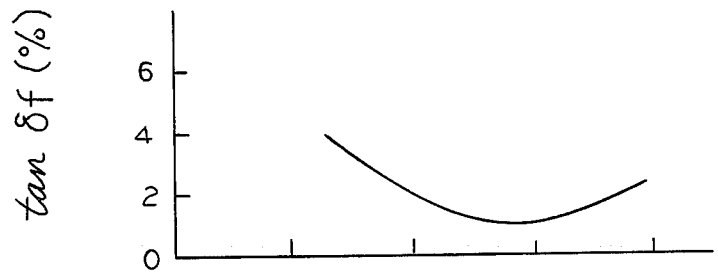
FIG. 7 is a graph indicating an example of the formation wet properties of a porous body according to the present invention in which (a), (b) and (c) represent the dielectric loss property, the electrostatic capacitance property, and the leakage current property, respectively.
Figure 7B:
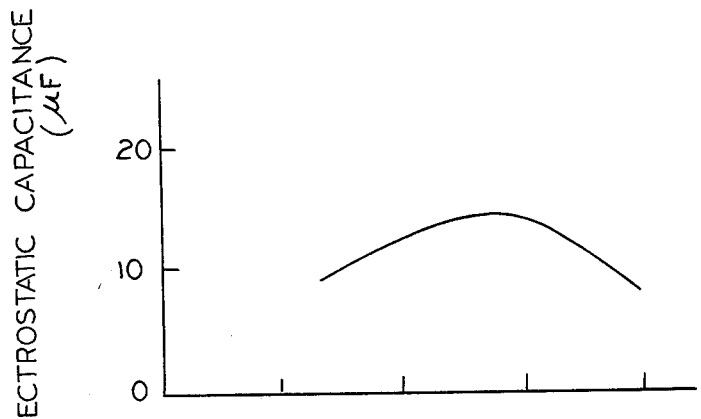
Figure 7C:
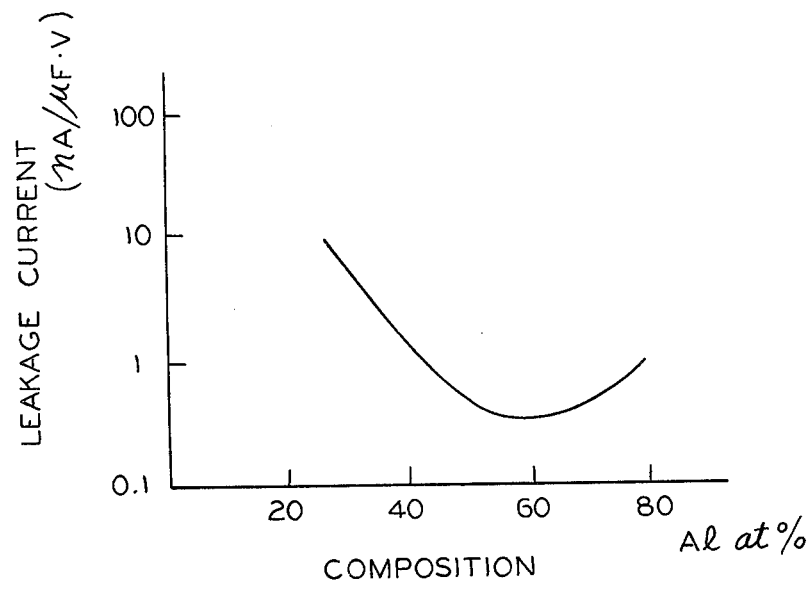

Then, leakage current was measured by immersing the anodically oxidized porous body in the same aqueous solution after application of a voltage of 8 V. Capacitance and dielectric loss were measured by immersing the anodically oxidized porous body in an aqueous solution of 30% of sulfuric acid. The results are shown in FIGS. 7(a), 7(b) and 7(c). The resultant porous body exhibited a capacitance per unit volume of $3 \times 10^4$ to $6.4 \times 10^4$ μFV/cm³ which was substantially equal to the highest value of a Ta porous body. The leakage current and dielectric loss of the porous doby were in the ranges of 10 to 0.4 nA/μFV and from 1.5 to 4%, respectively. The anodic body which was obtained from the starting powder mixture having 50 to 70 atomic % of aluminum was most excellent in respect of all of these properties.

Considering that the dielectric layer formed on the surface of the porous body, by the anodic oxidation, consists of the anodes of the surface layer having a compositional range of TiAl to TiAl₃, regardless of the composition of the starting powdery mixture, it seems strange that the leakage current and the dielectric loss of the capacitor properties depend on the composition of the starting powdery mixture. Essentially, if there is an ideal mixing of the starting powder and if the surface of the porous body after the heat-treatment is completely uniform, this phenomenon of leakage current and dielectric loss may not depend upon the starting composition. However, in the case of a powdery mixture containing a high content of titanium, for example, if the number of the titanium particles is relatively increased, a portion having a composition close to pure titanium may be produced in the surface of the resultant porous body. The surface portion having a composition close to pure titanium is difficult to anodically oxidize. Thus, the resultant anodically oxidized layer is inferior as an insulating film. The phenomenon that the leakage current is somewhat increased when the titanium content in the starting powder mixture is increased can be understood.

Figure 8A:
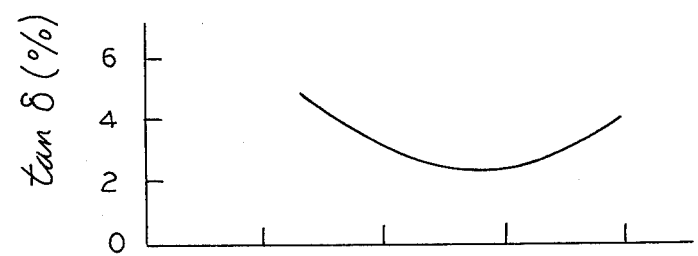
FIG. 8 is a graph indicating an example of the properties of a solidified porous body according to the present invention in which (a), (b) and (c) represent the dielectric loss property, the electrostatic capacitance, and the leakage current property, respectively.
Figure 8B:
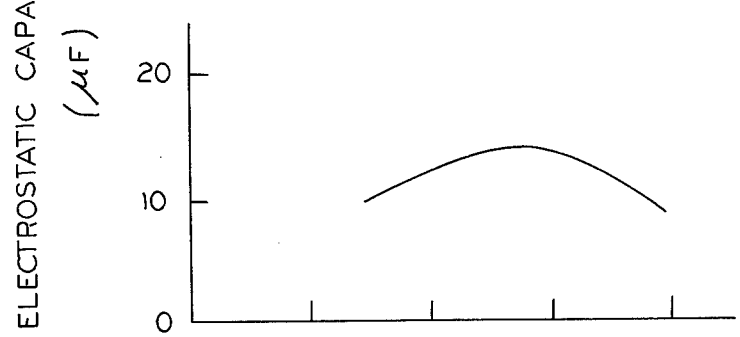
Figure 8C:
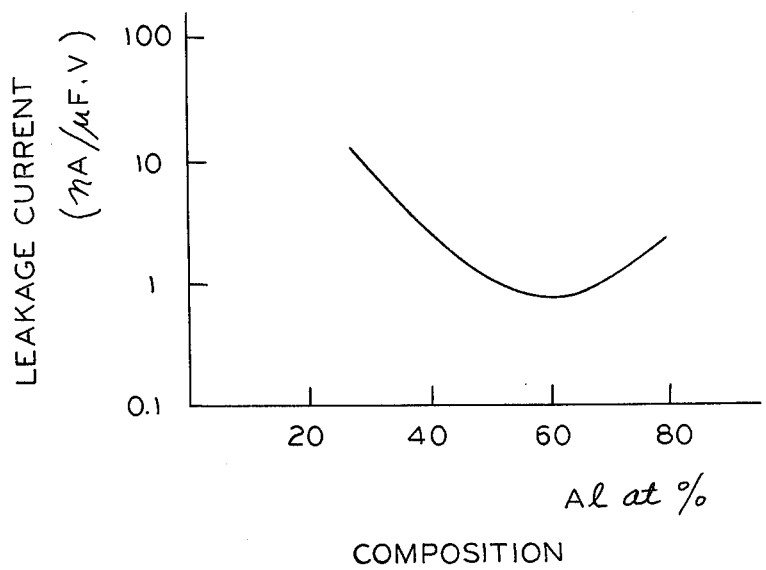

The electrical properties of the anodically oxidized porous body, after being solidified, are shown in FIGS. 8(a), 8(b) and 8(c). The negative electrode formation was carried out by impregnating the anodically oxidized porous body with manganese nitrate hexahydrate and heating the impregnated porous body at a temperature of 230° C. to decompose the manganese nitrate, thereby forming a manganese dioxide layer on the dielectric oxide film. This procedure was repeated 2 to 4 times. Thereafter, graphite and a silver paste were successively applied to the manganese dioxide layer.

Comparing the capacitance after the negative electrode formation as shown in FIG. 8(b) with the wet capacitance as shown in FIG. 7(b), it is apparent that at a stage when the thermal decomposition baking of manganese nitrate hexahydrate was repeated 2 to 4 times, the coverage of manganese dioxide on the surface of the porous body reaches almost 100%.

Also, as is seen in FIGS. 8(a) and 8(c), the dielectric loss and leakage current of the porous body after the negative electrode formation are in ranges of 2.5 to 5% and 0.7 to 15 nA/$\mu$F.V, respectively. Particularly, in the case of the starting powdery mixture containing 50 to 70 atomic % of aluminum, the resultant porous body exhibited excellent dielectric loss and leakage current from 2.5 to 3% and from 0.7 to 1 nA/$\mu$F.V, respectively.

For comparison purposes, a porous body having the conventional structure (not the double rugged structure) and the same capacitance per unit volume and size was produced from a mixture of titanium powder having an average particle size of 4 $\mu$m and aluminum powder having an average particle size of 5 $\mu$m. The resultant porous body was a manganese oxide layer made by thermal decomposition of manganese nitrate hexahydrate. At a stage when the thermal decomposition of manganese nitrate hexahydrate was repeated 2 times, the coverage of manganese dioxide on the surface of the porous body was 50% or less. Also, the solidified body exhibited a large dielectric loss of 10% or more. In addition, it was found that even if the thermal decomposition procedure was further repeated, the coverage of manganese dioxide was not increased and the leakage current was extremely increased.

Similarly, in the case of a Ta porous anode body, when manganese nitrate hexahydrate is directly applied to the porous body, the void channel contained in the body is partially clogged at the initial decomposition stage. As a result of this, the subsequent impregnation of the manganese nitrate is not performed to a satisfactory extent, which also results in a poor coverage of manganese dioxide. In order to avoid this disadvantage, it is a common practice for the manganese nitrate hexahydrate to be applied in the form of a dilute solution thereof in an alcohol. This solution is applied many times to the porous body, to attain a satisfactory coverage and impedance. According to this process, the thermal decomposition procedure should be repeated 5 to 10 times.

For experiments sake, this process was applied to the porous body having a double rugged structure which has been discussed in detail hereinabove. The porous body has the conventional structure (the same $\mu$F.V/vol and size) which has been used for comparison purposes. In the thermal decomposition procedure, a 50% methanol solution of manganese nitrate hexahydrate was used. The thermal decomposition procedure was repeated 5 to 10 times depending on the composition of the starting powdery mixture. Thereafter, graphite and silver paste were successively applied to the resultant manganese dioxide layer. In all of the resulting solidified porous bodies, the coverage of manganese dioxide reached almost 100%, but the leakage current value was a high level, $10^2$ to $10^3$ times as large as that shown in FIG. 8.

This result indicates a poor resistance of the Al-Ti porous anode body to the cathode-forming procedure. Also, this rsult clearly indicates that the porous structure, according to the present invention, exhibits a more excellent manganese dioxide-baking property than the conventional porous structure exhibits, which feature makes up for the above-mentioned poor resistance.

As has been detailedly described hereinabove, the present invention is epochmaking in that it provides a porous body for a solid electrolytic capacitor which is capable of substituting for a tantalum porous body and which exhibits a high capacitance and is inexpensive, and a process for producing the same.

We claim:

1. A porous body for a solid electrolytic capacitor, said body comprising a number of Ti-Al alloy particles in at least partial contact with each other to form an integral body, the surface of the respective Ti-Al alloy particles having a fine ruggednesses with surface irregularities in a size within a range of 0.5 to 5 $\mu$m, and the Al content of the Ti-Al alloy being in a range of from 50 to 70 atomic %.

2. A porous aggregate of titanium-aluminum alloy particles which have been formed by heat treatment of substantially uniformly mixed titanium particles of relatively large size and aluminum particles of relatively small size with said aluminum diffused into said titanium, said heat treatment effectively consolidating said mixture while said titanium-aluminum alloy particles are in a compacted mechanical contact with each other, said titanium-aluminum alloy particles forming a consolidated porous body pierced by voids therebetween, the surfaces of said titanium-aluminum alloy particles having a fine ruggedness, wherein said titanium particles are two-to-six times the size of the aluminum particles.

3. The aggregate to claim 2 wherein said titanium particles and said aluminum particles are heat-treated by a first aluminum diffusing heat treatment which is less than the temperature at which aluminum melts and said fine ruggedness is made of Kirkendall voids which occur during a first aluminum diffusing heat treatment.

* * * * *